US008537839B2

(12) United States Patent
Gintis et al.

(10) Patent No.: US 8,537,839 B2
(45) Date of Patent: Sep. 17, 2013

(54) TRAFFIC GENERATOR WITH DYNAMIC MPLS LABEL ASSIGNMENT

(75) Inventors: Noah Gintis, Westlake Village, CA (US); Alok Srivistava, Woodland Hills, CA (US); Victor Alston, Oak Park, CA (US)

(73) Assignee: Ixia, Calabasas, CA (US)

( * ) Notice: Subject to any disclaimer, the term of this patent is extended or adjusted under 35 U.S.C. 154(b) by 284 days.

(21) Appl. No.: 12/871,711

(22) Filed: Aug. 30, 2010

(65) Prior Publication Data

US 2012/0051259 A1 Mar. 1, 2012

(51) Int. Cl.
*H04L 12/28* (2006.01)
*H04L 12/56* (2006.01)
*H04L 29/06* (2006.01)

(52) U.S. Cl.
CPC ............... *H04L 45/00* (2013.01); *H04L 29/06* (2013.01)
USPC ........... 370/400; 370/218; 370/253; 370/389; 709/238

(58) Field of Classification Search
USPC .................. 370/218, 253, 389, 400; 709/238
See application file for complete search history.

(56) References Cited

U.S. PATENT DOCUMENTS

| | | | |
|---|---|---|---|
| 5,822,520 A | 10/1998 | Parker | |
| 6,028,847 A | 2/2000 | Beanland | |
| 6,233,256 B1 | 5/2001 | Dieterich et al. | |
| 6,295,557 B1 | 9/2001 | Foss | |
| 6,446,121 B1 | 9/2002 | Shah et al. | |
| 6,678,246 B1 | 1/2004 | Smyth | |
| 6,950,405 B2 | 9/2005 | Van Gerrevink | |
| 6,965,572 B1 | 11/2005 | Boodaghians | |
| 7,023,846 B1 | 4/2006 | Andersson | |
| 7,050,455 B2 | 5/2006 | Nishihara | |
| 7,099,438 B2 | 8/2006 | Rancu et al. | |
| 2002/0037008 A1 | 3/2002 | Tagami et al. | |
| 2002/0186689 A1* | 12/2002 | Miyabe | 370/355 |
| 2002/0194317 A1* | 12/2002 | Kanada et al. | 709/223 |
| 2002/0194368 A1* | 12/2002 | Kon et al. | 709/238 |
| 2003/0139919 A1 | 7/2003 | Sher et al. | |
| 2004/0258073 A1 | 12/2004 | Alexander | |
| 2006/0088060 A1 | 4/2006 | Fujikami et al. | |
| 2007/0115833 A1 | 5/2007 | Pepper et al. | |

(Continued)

OTHER PUBLICATIONS

Rosen, E., et al., Multiprotocol Label Switching Architecture, Network Working Group Request for Comments: 3031, Jan. 2001.

(Continued)

*Primary Examiner* — Pao Sinkantarakorn
*Assistant Examiner* — Richard K Chang
(74) *Attorney, Agent, or Firm* — SoCal IP Law Group LLP; John E. Gunther; Steven C. Sereboff

(57) ABSTRACT

There is disclosed a port unit and methods for testing a network. The port unit may include a traffic generator, traffic receiver, and a port processor. The traffic generator may include a memory that stores data defining a plurality of packet streams. The port processor may store label tracking data associating a plurality of label condition sets with one or more respective locations within the traffic generator memory. When a control packet associating a MPLS label with a specific label condition set is received via the traffic receiver, the port processor may store the MPLS label in one or more traffic generator memory locations associated with the specific label condition set in accordance with the stored label tracking data.

23 Claims, 10 Drawing Sheets

(56) References Cited

U.S. PATENT DOCUMENTS

2008/0107104 A1 5/2008 Olderdissen et al.
2008/0112332 A1 5/2008 Pepper
2010/0061378 A1 3/2010 Joyner et al.

OTHER PUBLICATIONS

Semeria, C., Multiprotocol Label Switching: Enhancing Routing in the New Public Network, White Paper, Juniper Networks, Sep. 27, 1999.

Trillium, Multiprotocol Label Switching (MPLS), The International Engineering Consortium, Web ProForum Tutorials, http://www.iec.org, Jun. 9, 2000.

European Patent Office, European Search Report for European Application No. 11008065.2-2416, mail date Feb. 23, 2012, pp. 1-7.

Sun et al. G-TEP: A GMPLS Testing and Emulation Platform, 2006 Asian Optical Fiber Communication & Optoelectronic Exposition & Conference: Oct. 24-27, 2006, pp. 1-3.

* cited by examiner

TRAFFIC GENERATOR WITH DYNAMIC MPLS LABEL ASSIGNMENT

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating traffic for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Layers 1, 2, and 3 of the structure are the physical layer, the data link layer, and the network layer, respectively.

Layer 1 protocols define the physical (electrical, optical, or wireless) interface between nodes of the network. Layer 1 protocols include various Ethernet physical configurations, the Synchronous Optical Network (SONET) and other optical connection protocols, and various wireless protocols such as WiFi.

Layer 2 protocols govern how data is logically transferred between nodes of the network. Layer 2 protocols include the Ethernet, Asynchronous Transfer Mode (ATM), Frame Relay, and Point to Point Protocol (PPP).

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of the Ethernet, ATM, FR, and/or PPP layer 2 protocols.

Historically, each router parsed each received packet to extract a destination address from a network layer header contained within the packet. The router then used the destination address to determine the route or path along which the packet should be retransmitted. A typical packet may pass through a plurality of routers, each of which repeats the actions of extracting the destination address and determining the route or path along which the packet should be retransmitted.

Multiprotocol Label Switching (MPLS) is a method for efficiently routing data through large networks. With MPLS, each packet is given a label that identifies the packet as a member of a particular forwarding equivalence class (FEC), where an FEC is defined to be a collection of packets (of any type or protocol) to be transmitted from a specific source to a specific destination along an associated label switched path (LSP) through the network. The MPLS label is a fixed-length field that may contain both forwarding and priority information. The MPLS label is commonly placed in the packet between the layer 2 header and the layer 3 header, but may also be embedded within the layer 2 header. The nodes of a network that employs MPLS consist of label switching routers (LSRs). Upon receiving a packet, each LSR determines how to forward the packet based on the label and, in some cases, the input port at which the packet was received. Thus the LSRs do not have to parse the packet and extract a destination address from a layer 3 header in order to determine how to forward the packet. Each LSR may change, or switch, the label prior to forwarding the packet. In some cases, a packet may include a stack of MPLS labels and an LSR may "pop" the stack to expose a new label prior to forwarding a packet.

The number of nodes of a network, the number and arrangement of paths which interconnect the nodes with each other, and the paths that connect the network with source and destination devices are determined by the network topology and are thus effectively fixed for the duration of a test session. However, the MPLS labels are negotiated between the LSRs and may be dynamic. For example, the MPLS labels assigned to various LSPs may be partially or completely different each time a network is tested. Further, MPLS labels may change during a test session, for example if an LSR fails or is rebooted during the test session, or if a path between two LSR's fails during a test session.

In order to test a packet switched network or a device included in a packet switched communications network, test traffic comprising a large number of packets may be generated, transmitted into the network at one or more ports, and received at different ports. In this context, the term "port" refers to a communications connection between the network and the equipment used to test the network. The received test traffic may be analyzed to measure the performance of the network. Each port connected to the network may be both a source of test traffic and a destination for test traffic. Each port may emulate a plurality of logical source or destination addresses. The number of ports and the communications paths that connect the ports to the network are typically fixed for the duration of a test session. The internal structure of the network may change during a test session, for example due to failure of a communications path or hardware device.

A series of packets originating from a single source and having a specific type of packet and a specific rate will be referred to herein as a "stream." A source may be, for example, a port on a network interface. A source may support multiple outgoing streams simultaneously and concurrently, for example to accommodate multiple packet types, rates, or destinations. "Simultaneously" means "at exactly the same time." "Concurrently" means "within the same time."

For the purpose of reporting network traffic data, the packets within a stream may be organized into flows, where a "flow" is any plurality of packets for which network traffic statistics are accumulated and reported. The packets in a given flow may be distinguished by a flow identifier contained in each packet. The flow identifier may be, for example, a dedicated identifier field, an address, a port number, a tag, or some other field or combination of fields within each data unit.

A plurality of concurrent streams may be combined to form the output from a traffic generator, which will be referred to herein as "test traffic". The streams within the test traffic may be combined through interleaving. The interleaving may be balanced, unbalanced, and distributed among the represented streams. To test a modern "triple play" network and network equipment, the test traffic may contain simulated data, audio, and video streams.

Throughout this description, elements appearing in block diagrams are assigned three-digit or four-digit reference designators, where the two least significant digits are specific to the element and the most significant digit or digits are the figure number. An element that is not described in conjunction with a block diagram may be presumed to have the same characteristics and function as a previously-described element having a reference designator with the same two least significant digits.

In block diagrams, arrow-terminated lines may indicate data paths rather than signals. Each data path may be multiple bits in width. For example, each data path may consist of 4, 8, 16, 32, 64, or more parallel connections.

Detailed Description

Description of Apparatus

Figure 1:
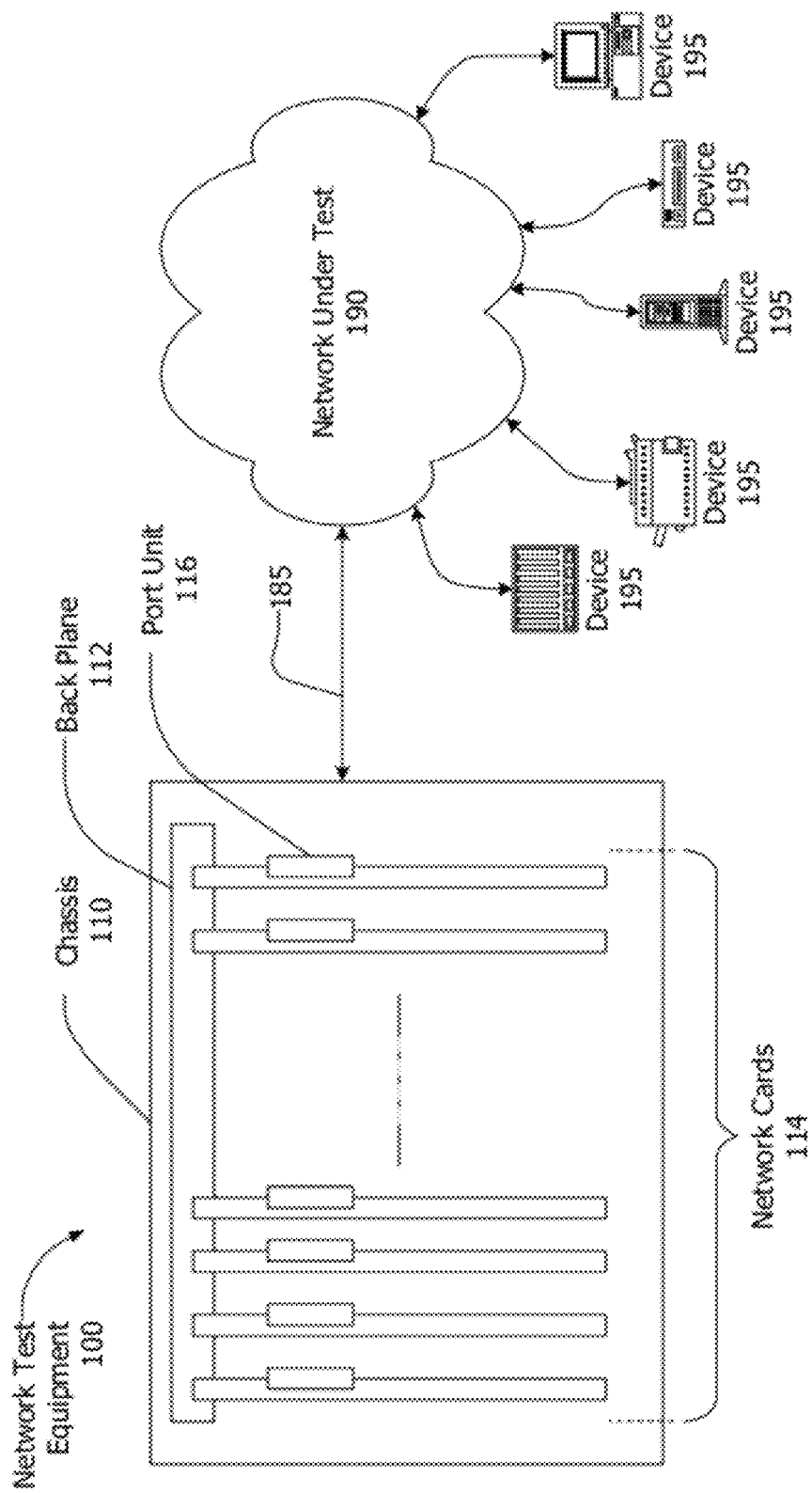
FIG. 1 is a block diagram of a network environment.

FIG. 1 shows a block diagram of a network environment. The environment may include network test equipment 100, a network 190 and plural network devices 195.

The network test equipment 100 may be a network testing device, performance analyzer, conformance validation system, network analyzer, or network management system. The network test equipment 100 may include one or more network cards 114 and a backplane 112 contained or enclosed within a chassis 110. The chassis 110 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 114 may support one or more well known standards or protocols such as the various Ethernet and Fibre Channel standards, and may support proprietary protocols as well.

The network cards 114 may include one or more field programmable gate arrays (FPGAs), application specific integrated circuits (ASICs), programmable logic devices (PLDs), programmable logic arrays (PLAs), processors and other kinds of devices. In addition, the network cards 114 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 114 may contain one or more port unit 116. Each port unit 116 may connect to the network 190 through one or more ports. The ports may be connected to the network through a communication medium 185, which may be a wire, an optical fiber, a wireless link, or other communication medium. Each network card 114 may support a single communications protocol, may support a number of related protocols, or may support a number of unrelated protocols. The network cards 114 may be permanently installed in the network test equipment 100 or may be removable.

The backplane 112 may serve as a bus or communications medium for the network cards 114. The backplane 112 may also provide power to the network cards 114.

The network devices 195 may be any devices capable of communicating over the network 190. The network devices 195 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, and multiplexers. In addition, the network devices 195 may include appliances, alarm systems, and any other device or system capable of communicating over a network.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 195 may communicate simultaneously with one another, and there may be plural logical communications paths between the network test equipment 100 and a given network device 195. The network itself may be comprised of numerous nodes providing numerous physical and logical paths for data to travel.

Figure 2:
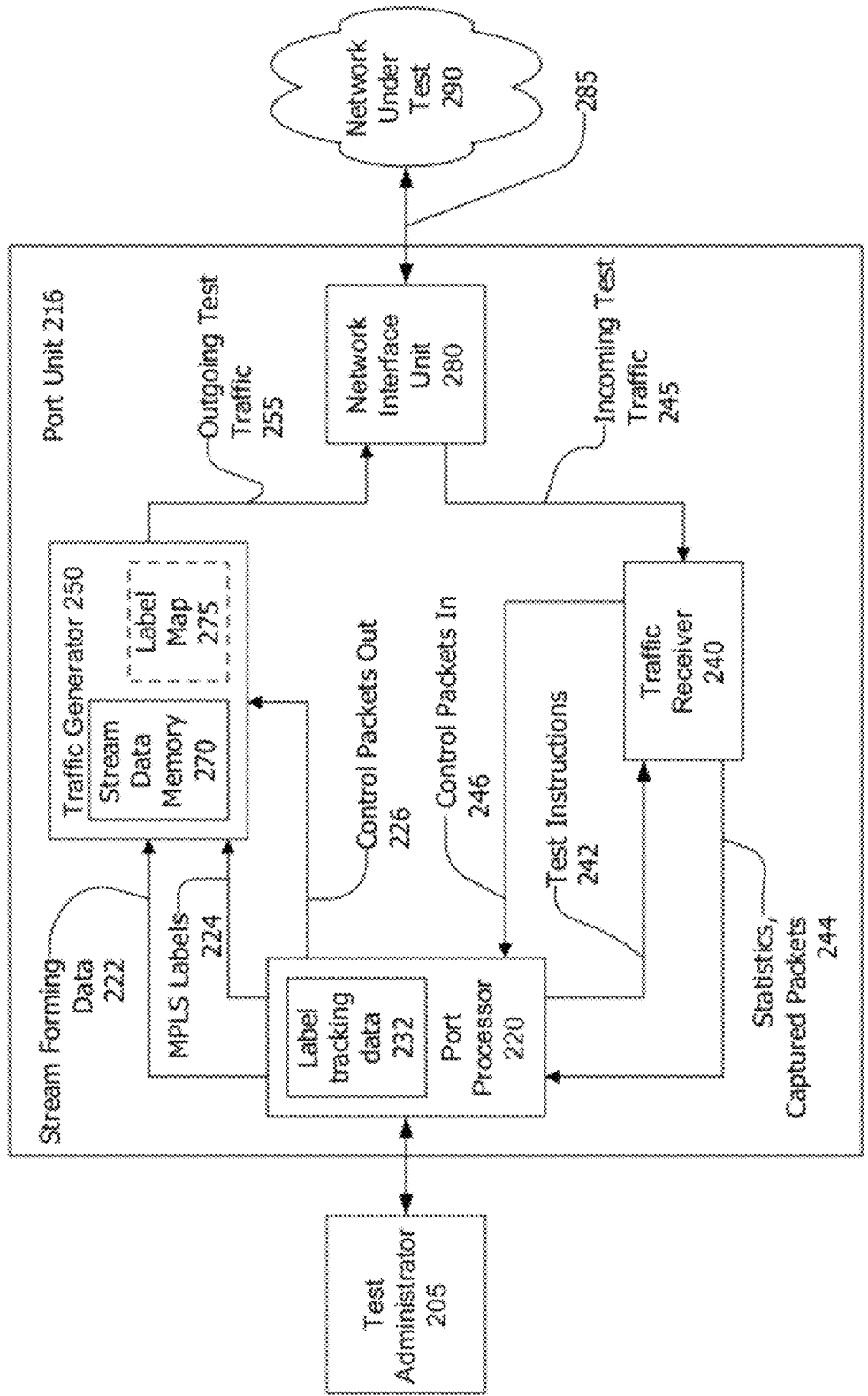
FIG. 2 is a block diagram of a port unit.

Referring now to FIG. 2, an exemplary port unit 216 may include a port processor 220, a traffic generator 250, a traffic receiver 240, and a network interface unit 280 which couples the port unit 216 to a network under test 290. The port unit 216 may be all or part of a network card such as the network cards 114.

The port processor 220 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port processor 220 may communicate with a test administrator 205. The test administrator 205 may be a computing device contained within, or external to, the network test equipment 100. The test administrator 205 may provide the port processor with instructions and data required for the port unit to participate in testing the network 290. The instructions and data received from the test administrator 205 may include, for example, definitions of packet streams to be generated by the port unit 216 and definitions of performance statistics that may be accumulated and reported by the port unit 216.

The port processor 220 may provide the traffic generator 250 with stream forming data 222 to form a plurality of streams that may be interleaved to form the outgoing test traffic 255. The traffic generator 250 may then generate the plurality of streams in accordance with the stream forming data 222. Each of the streams may include a sequence of packets. The packets within each stream may be of the same general type but may vary in length and content. The stream forming data 222 may include, for example, the type of packet, the frequency of transmission, definitions of fixed and variable-content fields within the packet and other information for each packet stream.

The network interface unit 280 may convert the outgoing test traffic 255 from the traffic generator 250 into the electrical, optical, or wireless signal format required to transmit the test traffic to the network under test 290 via a link 285, which may be a wire, an optical fiber, a wireless link, or other communication link. Similarly, the network interface unit 280 may receive electrical, optical, or wireless signals from the network over the link 285 and may convert the received signals into incoming test traffic 245 in a format usable to the traffic receiver 240.

The traffic receiver 240 may receive the incoming test traffic 245 from the network interface unit 280. The traffic receiver 240 may determine if each received packet is a member of a specific flow, and may accumulate test statistics for each flow in accordance with test instructions 242 provided by the port processor 220. The accumulated test statistics may include, for example, a total number of received packets, a number of packets received out-of-sequence, a number of received packets with errors, a maximum, average, and minimum propagation delay, and other statistics for each flow. The traffic receiver 240 may also capture and store specific packets in accordance with capture criteria included in the test instructions 242. The traffic receiver 240 may provide test statistics and/or captured packets 244 to the port processor 220, in accordance with the test instructions 242, for additional analysis during, or subsequent to, the test session.

The outgoing test traffic 255 and the incoming test traffic 245 may be primarily stateless, which is to say that the outgoing test traffic 255 may be generated without expectation of any response and the incoming test traffic 245 may be received without any intention of responding. However, some amount of stateful, or interactive, communications may be required or desired between the port unit 216 and the network 290 during a test session. For example, the traffic receiver 240 may receive control packets, which are packets containing data necessary to control the test session, that require the port unit to send an acknowledgement or response.

The traffic receiver 240 may separate incoming control packets from the incoming test traffic and may route the incoming control packets 246 to the port processor 220. The port processor 220 may extract the content of each control packet and may generate an appropriate response in the form of one or more outgoing control packets 226. Outgoing control packets 226 may be provided to the traffic generator 250. The traffic generator 250 may insert the outgoing control packets into the outgoing test traffic 255.

One form of control packet 246 that may be received by the port unit 220 may be packets that assign or bind MPLS labels. Such packets may originate from LSRs within the network 290. Packets binding MPLS labels may conform to the Label Distribution Protocol (LDP), Constraint-based Label Distribution Protocol, Border Gateway Protocol (BGP), and Resource Reservation Protocol—Traffic Extension (RSVP) or another protocol. Although each protocol uses different terminology, a packet that assigns a MPLS label generally associates a MPLS label and a label condition set, or a set of conditions for use of the MPLS label. The MPLS label may then be incorporated into each generated packet that satisfies the associated label condition set. Each label condition set may commonly include a set or range of IP destination addresses for which the MPLS label should be used. A label condition set may include other information such as a set or range of IP source addresses, one or more priority or quality of service levels, and other conditions for use of the MPLS label. A label condition set may also include constraints, such as a maximum data rate, for use of the MPLS label. Upon receipt of a packet associating an MPLS label and a label condition set, the port processor 220 may generate one or more packets that acknowledge the receipt of the MPLS label or attempt to negotiate a different label. Once MPLS labels are negotiated for one or more condition sets, the port processor 220 may provide the MPLS labels 224 to the traffic generator.

The port processor 220 may store, in a first memory, label tracking data 232. The label tracking data may be in the form of a list, table, or other data structure that relates each label condition set to the corresponding associated MPLS label, and that tracks where each MPLS label should be stored within the traffic generator 250. The traffic generator 250 may include a second memory, identified as a stream data memory 270, to store stream forming data 222 and, in some cases, MPLS labels 224. The traffic generator 250 may optionally include a third memory, identified as label map 275, specifically to store MPLS labels.

Figure 3:
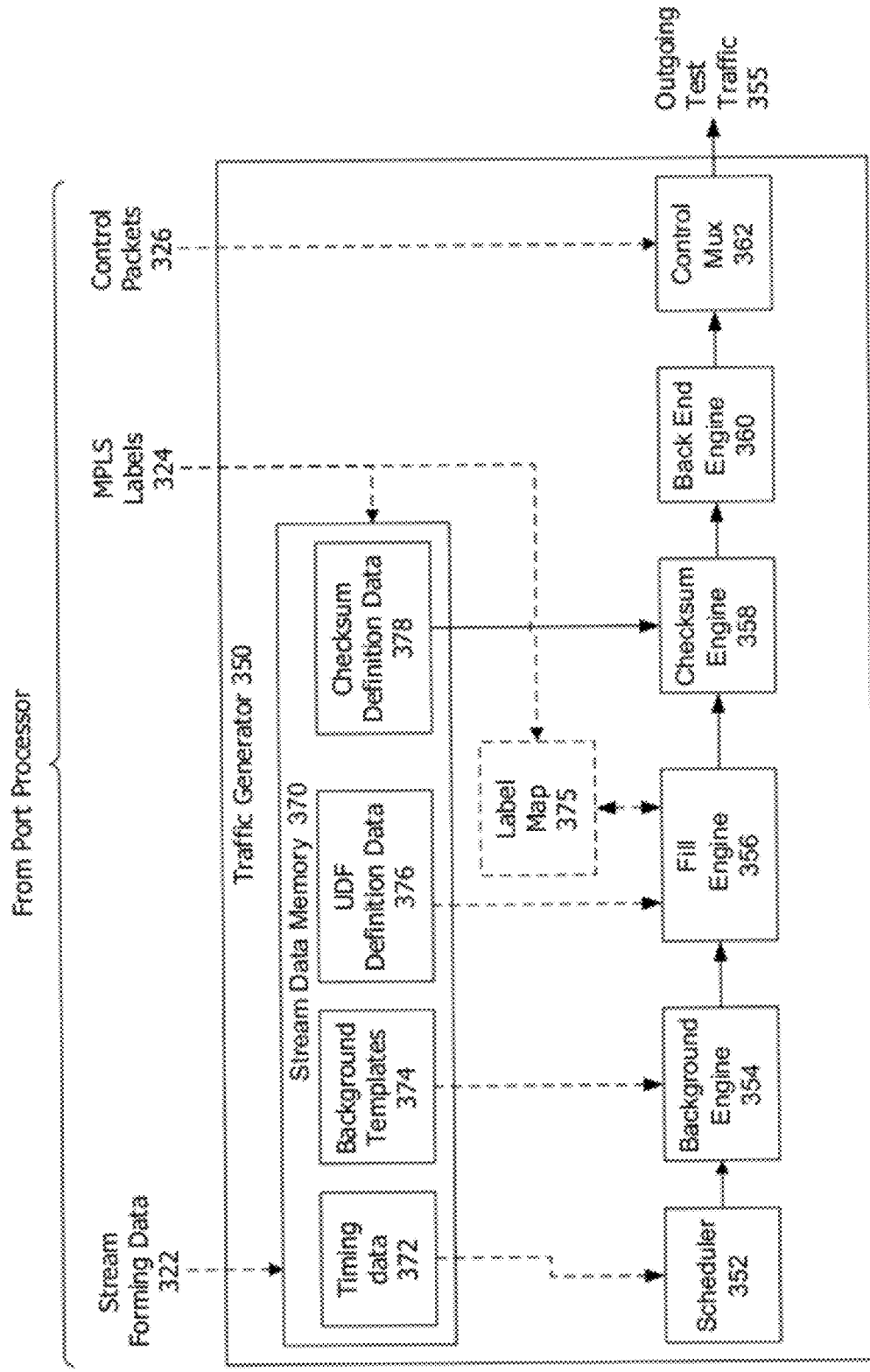
FIG. 3 is a block diagram of a traffic generator.

Referring now to FIG. 3, an exemplary traffic generator 350 may generate outgoing test traffic 355 composed of one or more interleaved streams of packets. The exemplary traffic generator 350 may be the traffic generator 250 of FIG. 2 and may be all or a portion of a network card 114 as shown in FIG. 1. The traffic generator 350 may include a stream data memory 370, a scheduler 352, a background engine 354, a fill engine 356, a checksum engine 358, a back end engine 360, and a control packet multiplexer 362. The traffic generator may optionally include a label map memory 375.

Within this description, the term "engine" means a collection of hardware, which may be augmented by firmware and/or software, that performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed "synthesis". The synthesis may be performed automatically using a synthesis tool. The gate netlist or other physical description may be further converted into programming code for implementing the engine in a programmable semiconductor device such as a field programmable gate array (FPGA), a programmable logic device (PLD), or a programmable logic array (PLA). The gate netlist or other physical description may be converted into process instructions and masks for fabricating the engine within an application specific integrated circuit (ASIC).

Within this description, the term "unit" also means a collection of hardware, firmware, and/or software, which may be on a larger scale than an "engine". For example, a unit may contain multiple engines, some of which may perform similar functions in parallel. The terms "engine" and "unit" do not imply any physical separation or demarcation. All or portions of one or more units and/or engines may be collocated on a common card, such as a network card 114, or within a common FPGA, ASIC, or other circuit device.

In FIG. 3, dashed arrows indicate a flow of data, and solid arrows indicate a sequence of operation, which may be accompanied by a flow of data. The scheduler 352, the background engine 354, the fill engine 356, the checksum engine 358, the back end engine 360, and the control packet multiplexer 362 may perform their respective functions sequentially or concurrently or some combination of sequentially and concurrently. The scheduler 352, the background engine 354, the fill engine 356, the checksum engine 358, the back end engine 360, and the control packet multiplexer 362 may be, at least in part, a pipeline such that multiple packets may be processed simultaneously in different portions of the traffic generator 350

The stream data memory 370 may store stream forming data 322 received from a port processor such as the port processor 220 or from another computer (not shown) which may direct and monitor network tests. The stream data memory 370 may store stream forming data defining a plurality of streams that constitute a testing session. The stream data memory 370 may include a background table containing one or more background templates 374 for each stream. Each background template 374 may define the general structure of each packet in the corresponding stream and contain the fixed content of each packet. When the background table includes a plurality of background templates 374 for a given stream, the templates may be used in sequence. The stream data memory 370 may also include, for each stream, data defining variable-content fields within each packet, data or instructions for setting the length of each packet, and data or instructions for filling the payload of each packet. Variable-content fields within each packet may include user defined fields (UDFs) defined by UDF definition data 376, and checksum fields defined by checksum definition data 378. The stream data memory 370 may also include, for each stream, timing information 372 required for the stream scheduler to schedule the packets comprising each stream at the appropriate time intervals. The stream data memory 370 may also include other data and instructions.

The stream data memory 370 may be dynamic random access memory (DRAM) or static random access memory (SRAM). The stream data memory 370 may be implemented within an ASIC, FPGA or other circuit device containing all or other portions of the traffic generator 350. The stream data memory 370 may be implemented wholly or partially with DRAM or SRAM memory chips external to the ASIC, FPGA or other device.

When the scheduler 352 determines that a packet should be generated for a specific stream, the background engine 354 may retrieve the appropriate background template 374 from the background table. The background engine 354 may expand or truncate the payload portion of the background template 374 to achieve an overall packet length determined by the scheduler 352 or the background engine 354.

The fill engine 356 may then fill or overlay variable-content field data onto the packet template based on the stream forming data stored in the stream data memory 370. The fill engine 356 may fill the payload portion of the packets. The fill engine may also fill user-defined fields based on the UDF definition data 376. Each UDF may be defined by a position, such as, for example, an offset from the start of the packet. Each UDF may be further defined by a type and additional data required to generate the content of the UDF in the packet being generated. For example, one type of UDF may be a counter field defined by an initial value, an increment value, and a maximum value. For further example, another type of UDF may be a table field that is filled with a value selected from a table of values that are used in rotation.

Another type of UDF may be a pointer UDF which includes a pointer that may be used to generate an address to retrieve a value from a memory. The pointer may be logically or mathematically incorporated into the address. For example, the pointer value may be multiplied by a predetermined constant and/or added to a predetermined offset to generate the address for reading the value from the memory. A table UDF or a pointer UDF may be particularly suited to inserting MPLS labels into packets.

A test session for a specific network may be designed to communicate packets over one or more (and typically a large plurality) of LSPs. However, since MPLS labels are assigned by negotiations between the LSRs within the network to be tested, the actual MPLS labels may not be known until after the test session is started. Additionally, MPLS labels may change during a test session if, for example, one or more LSR fails or reboots.

When the traffic generator hardware does not include the label map memory 375, each MPLS label may be a user defined field within the stream forming data stored in the stream data memory 370. In this case, the MPLS label or labels associated with each stream may be stored within the UDF definition data 376. In this case, MPLS labels 324 may be stored in specific locations in the stream data memory 370. Note that a given MPLS label may be used by multiple streams (for example different types of packets sent between the same source and destination addresses), and each stream may use multiple MPLS labels (for packets sent from the same source to different destinations). Thus an MPLS label 324 may have to be stored in multiple locations within the stream data memory 370.

When the traffic generator hardware includes the label map memory 375, a plurality of label condition set identification numbers (LCSIDs) may be associated, for example sequentially or randomly, to corresponding label condition sets during the design of a test session. The stream definition data defining streams containing MPLS labels may include one or more pointer UDFs where the pointer value is set to one of the LCSIDs. The LCSID may then be used to generate an address to retrieve the associated MPLS label from the label map memory 375. The label map memory 375 may be separate from, or a portion of, the stream data memory 370. The port processor 220 may store MPLS labels into the appropriate location within the label map memory 375 as the MPLS labels are received from the network under test 290. The label map memory 375 may allow the port processor 220 to write newly-received labels into only a single location the label map memory 375.

After the fill engine 356 has inserted the content of the payload and the content of the user defined fields into the background template, the checksum engine 358 may calculate one or more checksums as defined by the checksum definition data 378 for the packet being generated. The checksum engine 358 may insert the one or more calculated checksums into the background template. The back end engine 360 may add a cyclic redundancy check value and/or a timestamp to each packet as the test traffic 355 is sent to a network interface unit, such as the network interface unit 280 for transmission to the network under test 290.

The traffic generator 350 may also include a control multiplexer 362 that receives control packets from an external processor, such as the port processor 220, and interleaves the control packets into the outgoing test traffic.

The scheduler 352, background engine 354, the fill engine 356, the checksum engine 358 the control multiplexer 362, and the back end engine 360 may include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The physical partitioning of the components of the traffic generator 350 may be different from the functional partitioning shown in FIG. 3, such that a given functional component or block may be divided between two or more circuit devices and a single circuit device may contain all or portions of two or more functional components or all functional components.

Figure 4:
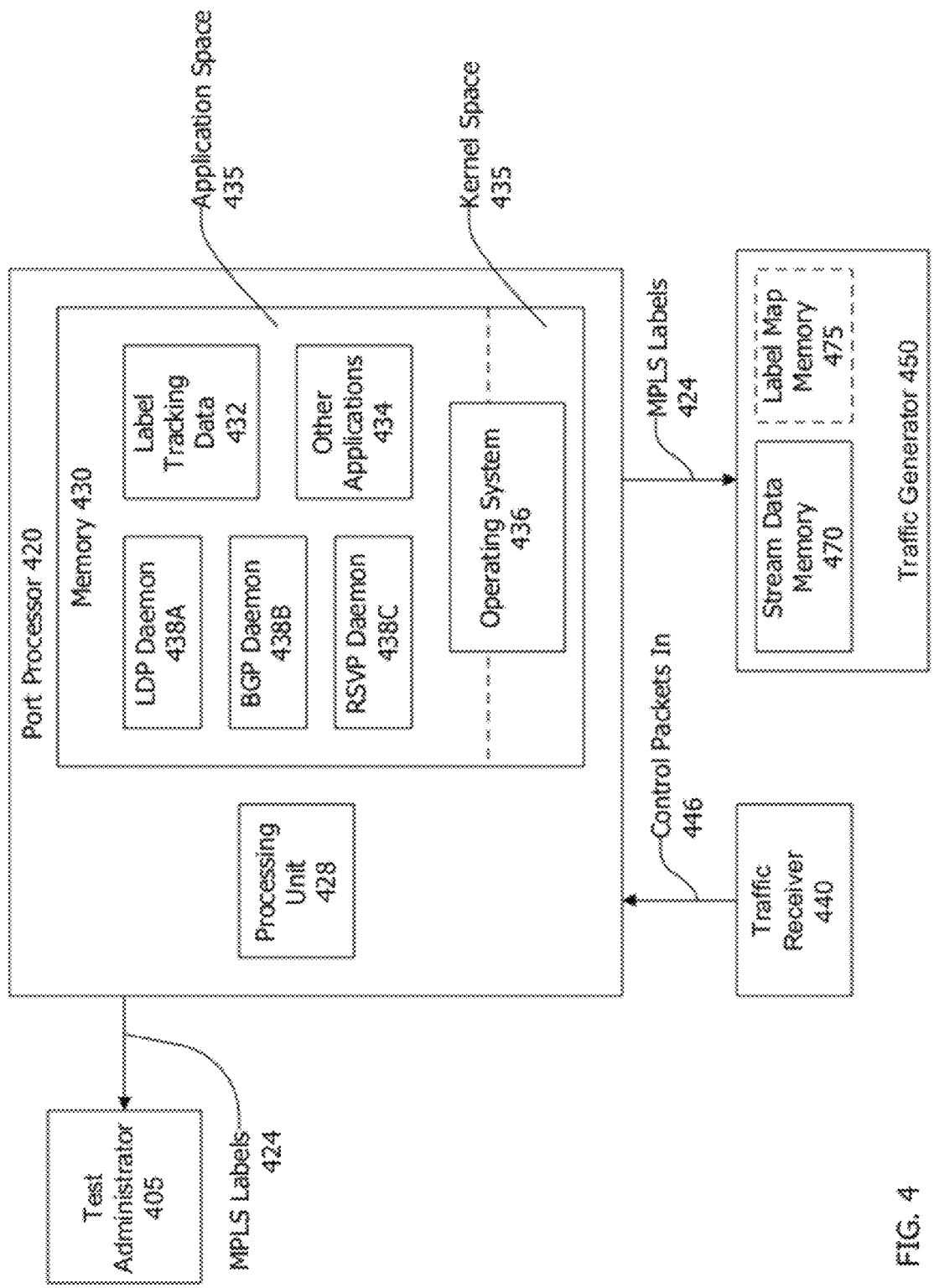
FIG. 4 is a block diagram of a port processor.

Referring now to FIG. 4, a port processor 420, which may be the port processor 220, may include a processing unit 428 and memory 430. The port processor 420 may communicate with a test administrator 405, a traffic receiver 440, and a traffic generator 450, which may be the test administrator 205, the traffic receiver 240, and the traffic generator 250, respectively. The memory 430 may be used to store both programs, such as an operating system 436 and applications 434, and data, such as label tracking data 432. The memory 430 may include multiple memory device and types. For example, the memory 430 may include fixed or programmable read-only memory for storing all or portions of the operating system 436 and volatile or nonvolatile random access memory for storing applications and data. The memory 430 may be logically divided into a kernel space 435 and an application space 431. All of portions of the operating system 436 may be stored in kernel space 435.

The programs stored in the memory 430 may include one or more daemons for managing MPLS labels. In the example of FIG. 4, separate daemons 438A, 438B, and 438C are stored in the memory 430 for managing MPLS labels received using the LDP, BGP, and RSVP protocols, respectively. More or fewer daemons may be stored in the memory 430. When a control packet 446 assigning one or more MPLS labels is received from a traffic receiver 440, the appropriate daemon 438A, 438B, 438C may be executed to cause the port processor to extract each MPLS label and the corresponding label condition set from the packet and store each MPLS label in the appropriate locations within the traffic generator 450. For example, the daemon may extract an MPLS label and a label condition set including a range of destination IP addresses from the received control packet. The daemon may refer to pre-stored label tracking data 432 to identify the corresponding label condition set, and to identify memory locations within the traffic generator 450 where the MPLS label should be stored. The daemon may then store the extracted MPLS label in one or more locations within a stream data memory 470 and/or a label map memory 475 within the traffic generator 450. The daemon may also inform one or more application program 434, the operating system 436, and the test administrator 405 of the newly received label.

Figure 5:
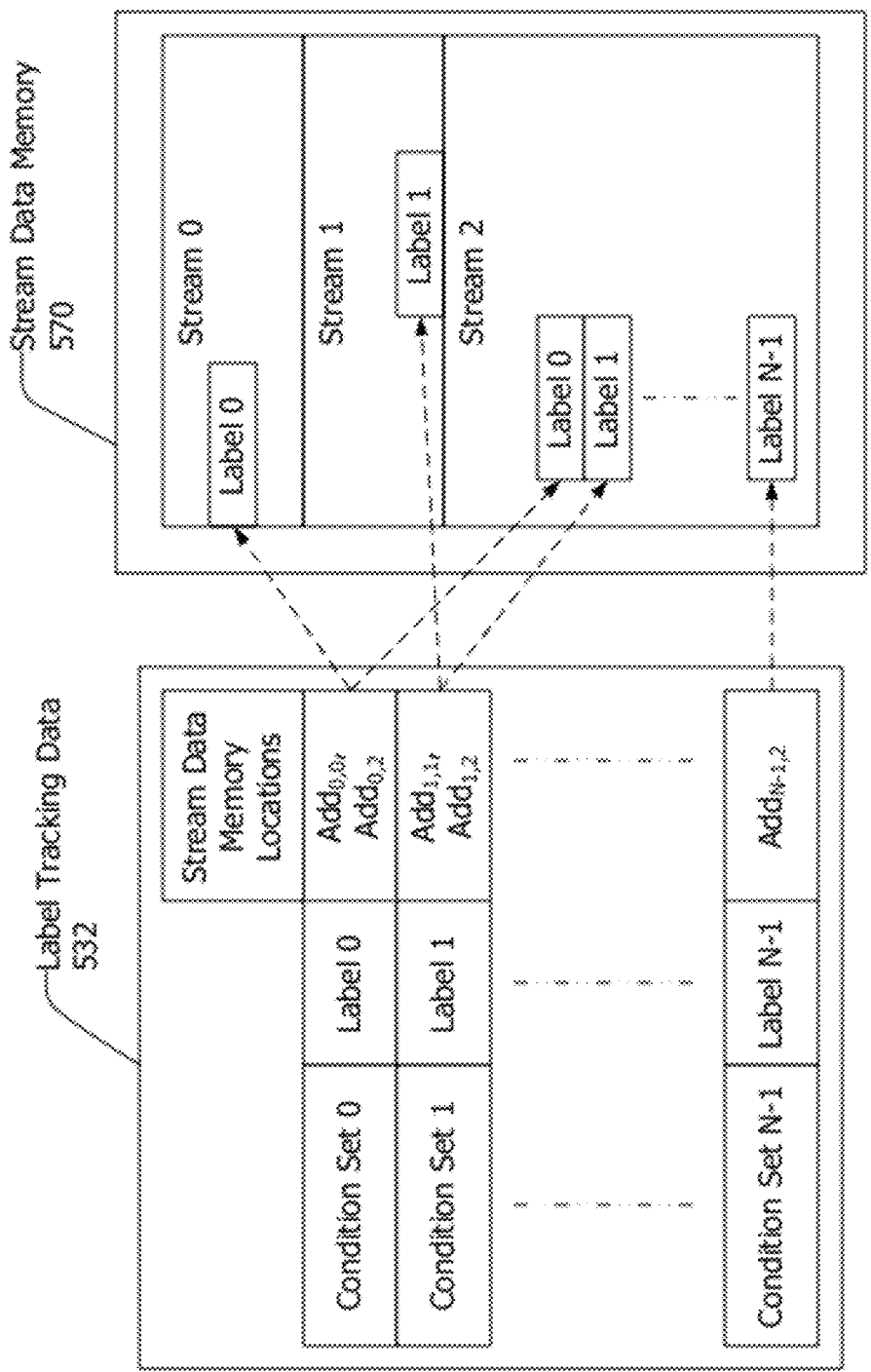
FIG. 5 is a schematic representation of label tracking data.

FIG. 5 shows an exemplary organization for label tracking data 532 and a stream data memory 570 for use when a traffic generator does not include a label map memory. In this case, the label tracking data 532 may include data to uniquely identify each label condition set and data to associate each label condition set with one or more locations within the stream data memory 532. In this example, the stream data memory contains stream forming data for three streams, identified as Stream 0, Stream 1, and Stream 2. The stream forming data for Stream 0 includes Label 0, which may be incorporated into every packet within Stream 0. Similarly, the stream forming data for Stream 1 includes Label 1, which may be incorporated into every packet within Stream 1. The stream forming data for stream 2 includes a list of N labels (Label 0 thru Label N−1) which may be used, for example, in rotation as the packets within Stream 2 are generated.

The label tracking data 532 may include data that uniquely identifies each label condition set for Label Condition Set 0 to Label Condition Set N−1. For example, each label condition set may include a range of destination IP (Internet protocol) addresses. Each condition set may include other information, for example a range of source IP addresses and/or a priority or quality of service level. MPLS labels for packets conforming to protocols other than IP may be associated with other types of conditions. The label tracking data may also include, for each label condition set, addresses or locations where the corresponding MPLS label should be stored in the stream data memory 570. In this example, there are two addresses associated with each of Label Condition Set 0 and Label Conditions Set 1, and one address associated with Label Condition Set N−1. The notation $Add_{i,j}$ means the address where Label i should be stored within the stream forming data for Stream j.

Figure 6:
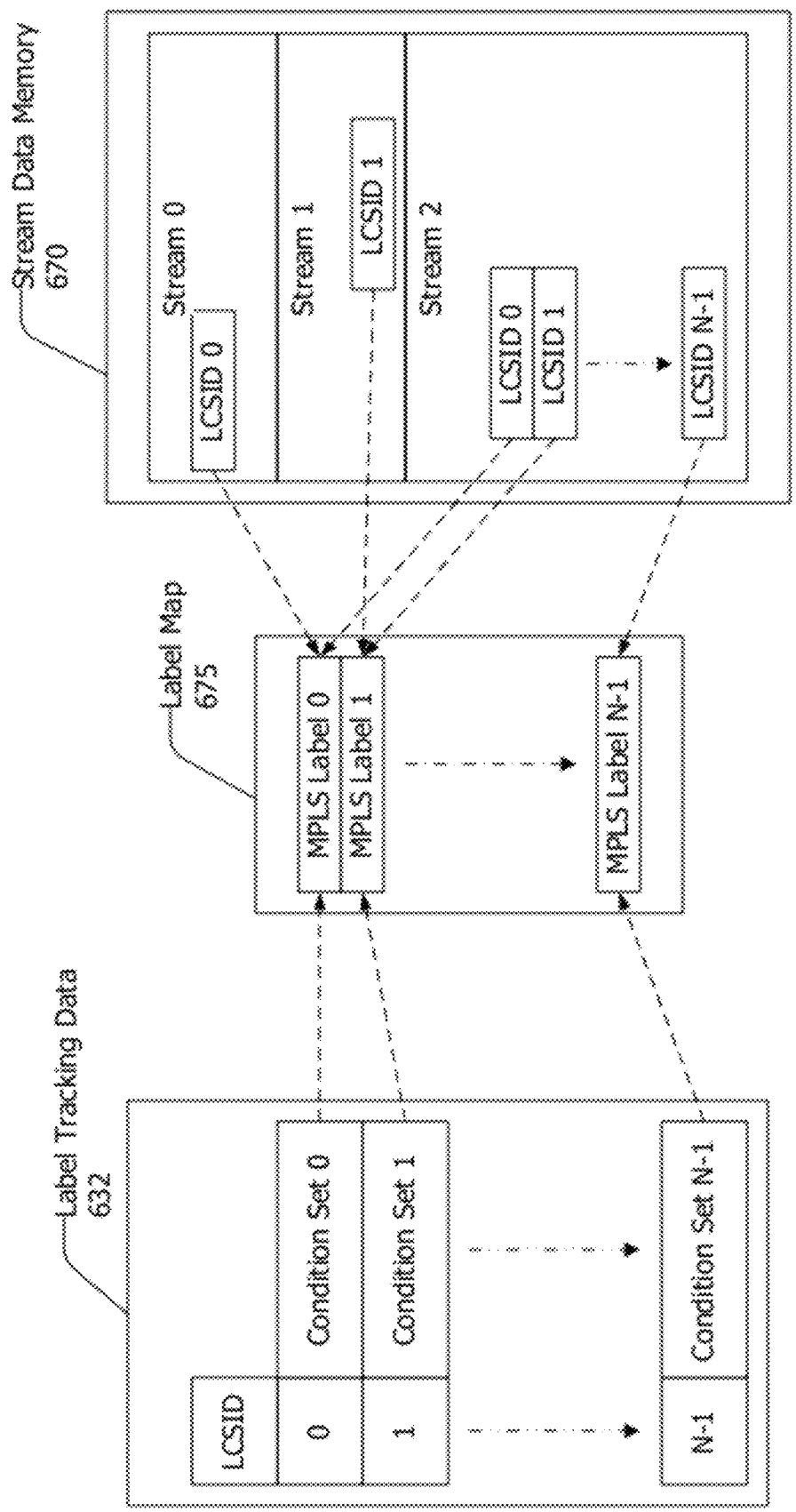
FIG. 6 is a schematic representation of label tracking data.

FIG. 6 shows an exemplary organization for label tracking data 632 and a stream data memory 670 for use when a traffic generator does include a label map memory 675. The label map memory 670 may be a memory organized as a plurality of independently readable and writable words, each of which contains an MPLS label. The exemplary label map memory 670 contains N MPLS labels, which are conventionally designated Label 0 through label N−1, and respectively associated with label condition set ID numbers (LCSIDs) 0 through N−1. The MPLS labels corresponding to the label condition sets may be stored in sequence in the label map 675. In this example, the stream data memory 670 contains stream forming data for three streams, identified as Stream 0, Stream 1, and Stream 2. However, in contrast to the example of FIG. 5, the stream forming data in the stream data memory 670 does not include MPLS labels, but rather includes LCSIDs that point to the corresponding labels in the label map memory.

During a test session, a port processor, such as the port processor 450, may receive control packets that assign or change the MPLS label associated with a specific label condition set. The port processor may then use the label tracking data 632 to retrieve the LCSID associated with the specific condition set. The port processor may then use the retrieved LCSID to generate an address to store the MPLS label in the appropriate position in the label map memory 675. For example, the LCSID may be multiplied by a predetermined scale factor and/or added to a predetermined offset to form the address used to write the MPLS label into the label map memory 675. Changing an MPLS label for the specific label condition set in the label map memory 675 effectively changes each stream that uses that label.

Description of Processes

Figure 7:
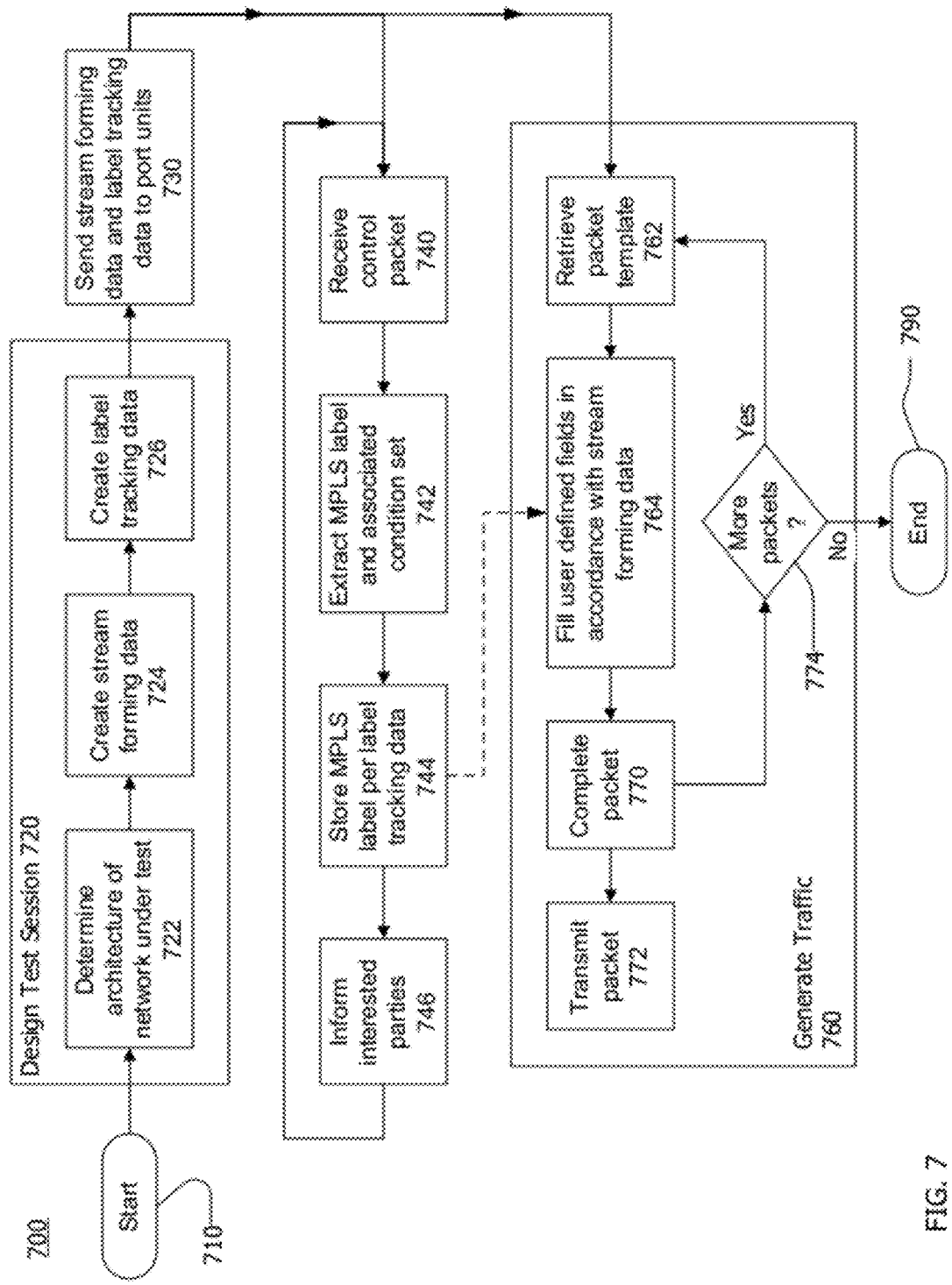
FIG. 7 is a flow diagram of a process for generating traffic.

Referring now to FIG. 7, a process 700 for generating traffic may start at 710 and may end at 790 after a large number of packets have been generated, or until stopped by an operator action (not shown in FIG. 7). The process 700 may be appropriate for generating traffic using a traffic generator, such as the traffic generator 350, that does not include a label map memory.

At 720, a test session may be designed. The test session design may be done, for example, by a test administrator computing device, such as the test administrator 205, coupled to one or more port units, such as the port unit 216. Designing the test session may include, at 722, determining or defining the architecture of the network or network equipment. Determining the network architecture may include negotiating one or more label conditions sets and corresponding MPLS labels and associating each condition set with a respective label condition set identifier (LCSID).

At 724, streams to be generated during the test session may be defined and the stream forming data may be created. The stream forming data may include, for each stream, one or more background templates, UDF definition data, checksum definition data, and other data. At least some of the background templates and/or UDF definition data may include one or more locations for MPLS labels to be inserted.

At 726, labeling tracking data may be created to track where the respective MPLS label associated with each LCSID should be stored within the steam forming data created at 724.

At 730, the stream forming data created at 724 and the label tracking data created at 726 may be sent to at least one port unit to commence the test session. Commonly, a test session may involve a plurality of port units. In this case, each of the plurality of port units may receive stream forming data and label tracking data only for streams that originate at the port unit. The stream forming data may be stored, for example, in a stream data memory within a traffic generator, such as the traffic generator 250, at each port unit. The label tracking data may be stored, for example, within the memory of a port processor, such as the port processor 220, at each port unit.

At 740, the port unit may receive a control packet containing a new MPLS label associated with a stream that originates at the port unit. In some cases, a control packet may contain a plurality of MPLS labels assigned to a respective plurality of condition sets. Control packets containing MPLS labels may be provided spontaneously by routers within the network under test. The port unit may generate and transmit control packets requesting MPLS labels for some or all of the streams that originate or terminate at the port unit, and the routers within the network under test may provide the MPLS labels in response to these requests. In cases where a test session involves plural port units, each port unit may receive MPLS labels only for streams that originate and/or terminate at the port unit.

At 742, each MPLS label and the associated label condition set may be extracted from the control packet. At 744, each extracted MPLS label may be stored in accordance with label tracking data sent to the port unit at 730. Specifically, the label tracking data may be searched to identify a label condition set that matches the label condition set extracted from the control packet at 742. Once the appropriate label conditions set is identified, the MPLS label may be stored within the stream forming data in the port unit using addresses retrieved from the label tracking data.

At 746, other interested parties may be informed of the newly received MPLS label. Other interested parties may include any or all of a test administrator, such as the test administrator 205, an operating system running on the port processor, and one or more application programs running on the port processor.

The receipt and storage of MPLS labels at 740 to 746 may occur frequently during the design of the test session, but may also occur during the test session. For example, MPLS labels may be changed by the network under test if a router within the network fails or is rebooted, or to balance load within various portions of the network. Thus the actions at 740 to 746 may occur cyclically in parallel with, and without interrupting, the generation of test traffic throughout the test session. The actions from 740 to 746 may be performed by a daemon, such as the daemons 438A-438C, running on the port processor.

Test traffic may be generated at 760 by a traffic generator such as the traffic generator 250. The actions from 762 to 774 generate a single packet at a single port unit. These actions may be performed cyclically thousands or even millions of times during a test session. For simplicity, the actions from 762 to 774 will be described as if each packet is completed before the generation of the subsequent packet is started. However, the actions from 762 to 774 may be performed in a pipelined manner such that a plurality of packets are being generated, at different stages of the process 760, simultaneously.

At 762 a packet template for a packet to be generated may be retrieved from the stream data memory that stores at least a portion of the stream forming data created at 724. The packet to be generated may include a plurality of user defined fields (UDFs). One or more user defined fields may contain MPLS labels. At 764, the UDFs may be filled in accordance with the stream forming data. Filling UDFs may include overlaying the packet template with one or more MPLS labels retrieved from the stream forming data At 770 the packet may be completed. Completing the packet may include filling portions of a payload of the packet, calculating and inserting checksums, calculating and inserting a cyclic redundancy check, inserting a time stamp, and other actions. The packet completed at 770 may be transmitted to the network under test at 772.

At 774, a determination may be made if additional packets should be generated. when an addition packet is required, the process 700 may continue cyclically from 762. When all packets have been generated, the process 700 may end at 790.

Figure 8:
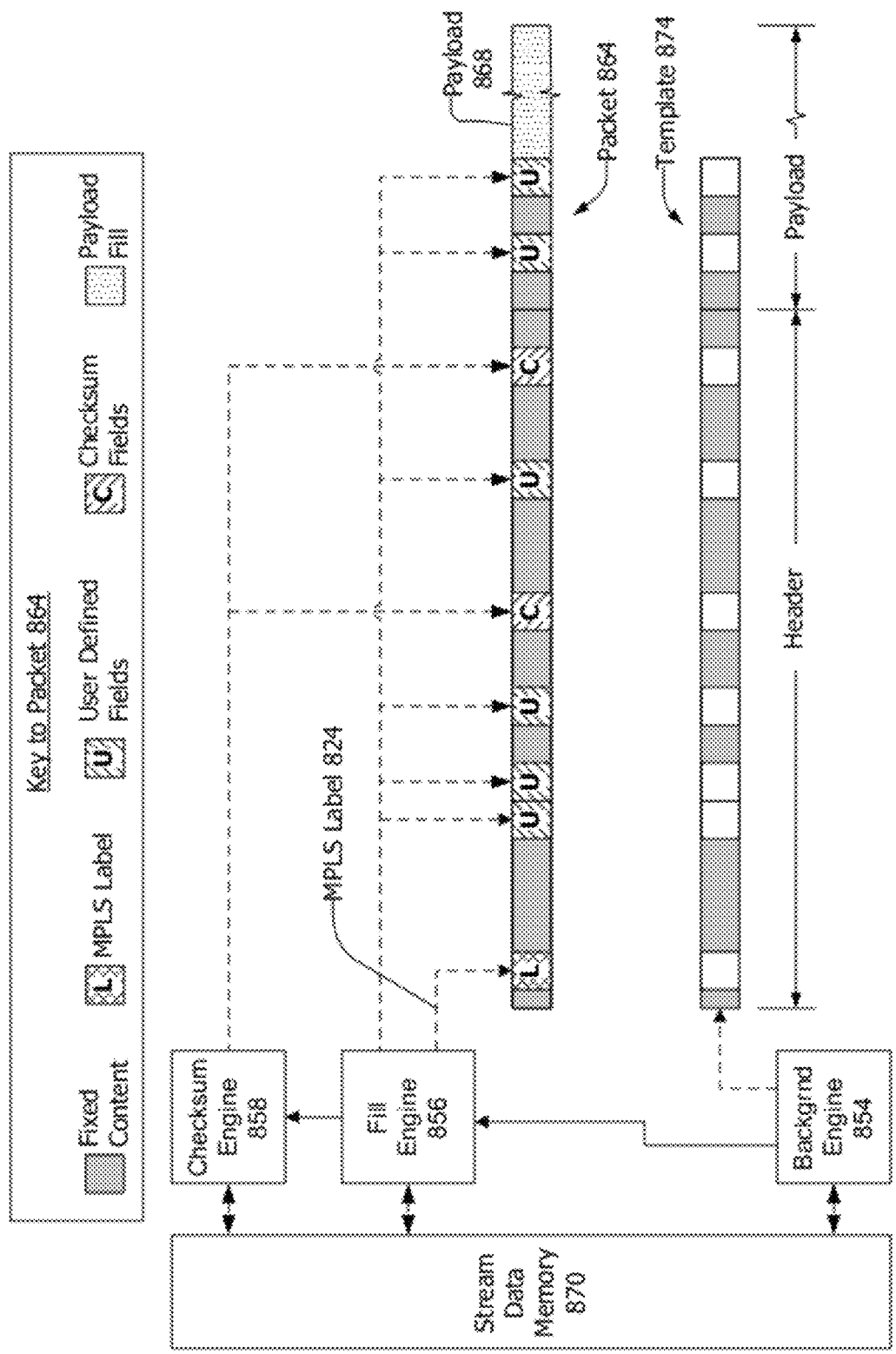
FIG. 8 is a schematic representation of a traffic generator generating a packet.

Exemplary actions taken by a traffic generator, such as the traffic generator 350 of FIG. 3, to generate a packet 864 are illustrated schematically in FIG. 8. To generate the packet 864, a background engine 854 may retrieve a template 874 from a stream data memory 870. The template 874 may define the structure of the packet and may include fixed content, shown with solid shading, of the packet header and the packet payload. The template may provide locations for variable-content fields, shown without shading.

A fill engine 856 may receive the template 874 retrieved by the background engine 854. The fill engine 856 may insert user-defined data into UDF locations in the template. In this example, one of the UDFs is filled with an MPLS label 824, indicated with double hatching. The exemplary packet 864 contains six additional UDFs. Each UDF may be filled in accordance with stream forming data from the stream data memory 870. The filled additional UDFs in the packet 864 are shown with diagonally hatching and identified by the letter U. The number and location of the UDFs shown in FIG. 8 is arbitrary. A packet may have more or fewer than six UDFs, and more or fewer than one MPLS label. The fill engine 856 may also fill portions of a payload 868 of the packet 864.

After the fill engine has populated the payload 868, the user defined fields U, and the MPLS label 824, a checksum engine 858 may calculate and insert one or more checksums into the packet 864. The exemplary packet 864 contains two checksum fields shown with diagonal hatching and identified by the letter C. The location of the checksum fields in the packet 864 is arbitrary. A packet may have more or fewer than two checksum fields. To complete the packet 864, a back end engine (not shown in FIG. 8) may insert a cyclic redundancy check value and/or a time code into the packet 864 as it being transmitted.

Figure 9:
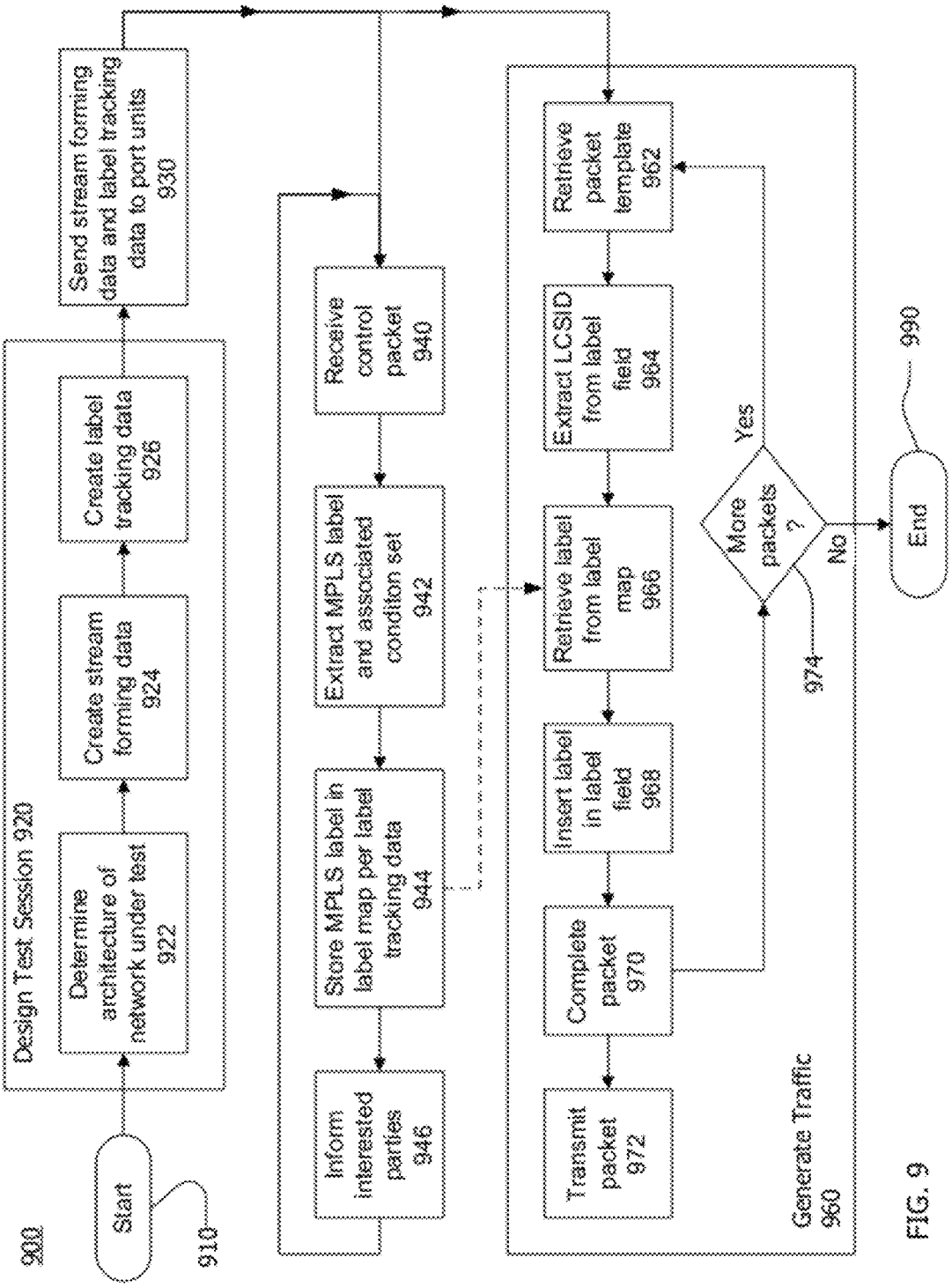
FIG. 9 is a flow diagram of a process for generating traffic.

Referring now to FIG. 9, a process 900 for generating traffic may be appropriate for generating traffic using a traffic generator, such as the traffic generator 350, including a label map memory. The process 900 may start at 910 and may end at 990 after a large number of packets have been generated, or until stopped by an operator action (not shown in FIG. 9)

At 920, a test session may be designed. Designing the test session may be similar to the actions 720-726 described in conjunction with FIG. 7 except that the stream forming data created at 924 may include LCSIDs rather than locations to store MPLS Labels. Additionally, the label tracking data created at 926 may include data defining each label condition set and relating each LCSID to a location within the label map memory, rather than locations within the stream forming data.

At 930, the stream forming data created at 924 and the label tracking data created at 926 may be sent to at least one port unit to commence the test session. When a test session involves a plurality of port units, each of the plurality of port units may receive stream forming data and label tracking data only for streams that originate at the port unit. The stream forming data may be stored, for example, in a stream data memory within a traffic generator, such as the traffic generator 250, at each port unit. The label tracking data may be stored, for example, within the memory of a port processor, such as the port processor 220, at each port unit.

From 940-946, the port unit may receive and store control packets containing a MPLS labels associated with a stream that originates at the port unit. The actions from 940-946 may be similar to the actions 740-746, except that, at 944, MPLS labels may be stored in respective locations in the label map memory.

The receipt and storage of MPLS labels at 940 to 946 may occur frequently during the initiation of the test session, and may also occur cyclically in parallel with, and without interrupting, the generation of test traffic throughout the test session. The actions from 940 to 946 may be performed by a daemon, such as the daemons 438A-438C, running on the port processor.

Test traffic may be generated at 960 by a traffic generator such as the traffic generator 250. The actions at 962 and from 970 to 974 may be similar to the actions 762 and 770 to 774.

At 964, the traffic generator may extract an LCSID or other pointer from a label field in a packet template retrieved at 962. At 966, the LCSID or pointer from 964 may be used to read a respective MPLS label from the label map memory. At 968, the MPLS label may be inserted into the packet template. The MPLS label may be inserted into the label field that initially held the LCSID At 970 the packet may be completed. Completing the packet may include filling other UDFs, filling portions of a payload of the packet, calculating and inserting checksums, calculating and inserting a cyclic redundancy check, inserting a time stamp, and other actions. The packet completed at 970 may be transmitted to the network under test at 972.

At 974, a determination may be made if additional packets should be generated. If an addition packet is required, the process 900 may continue cyclically from 962. If all packets have been generated, the process 900 may end at 990.

Figure 10:
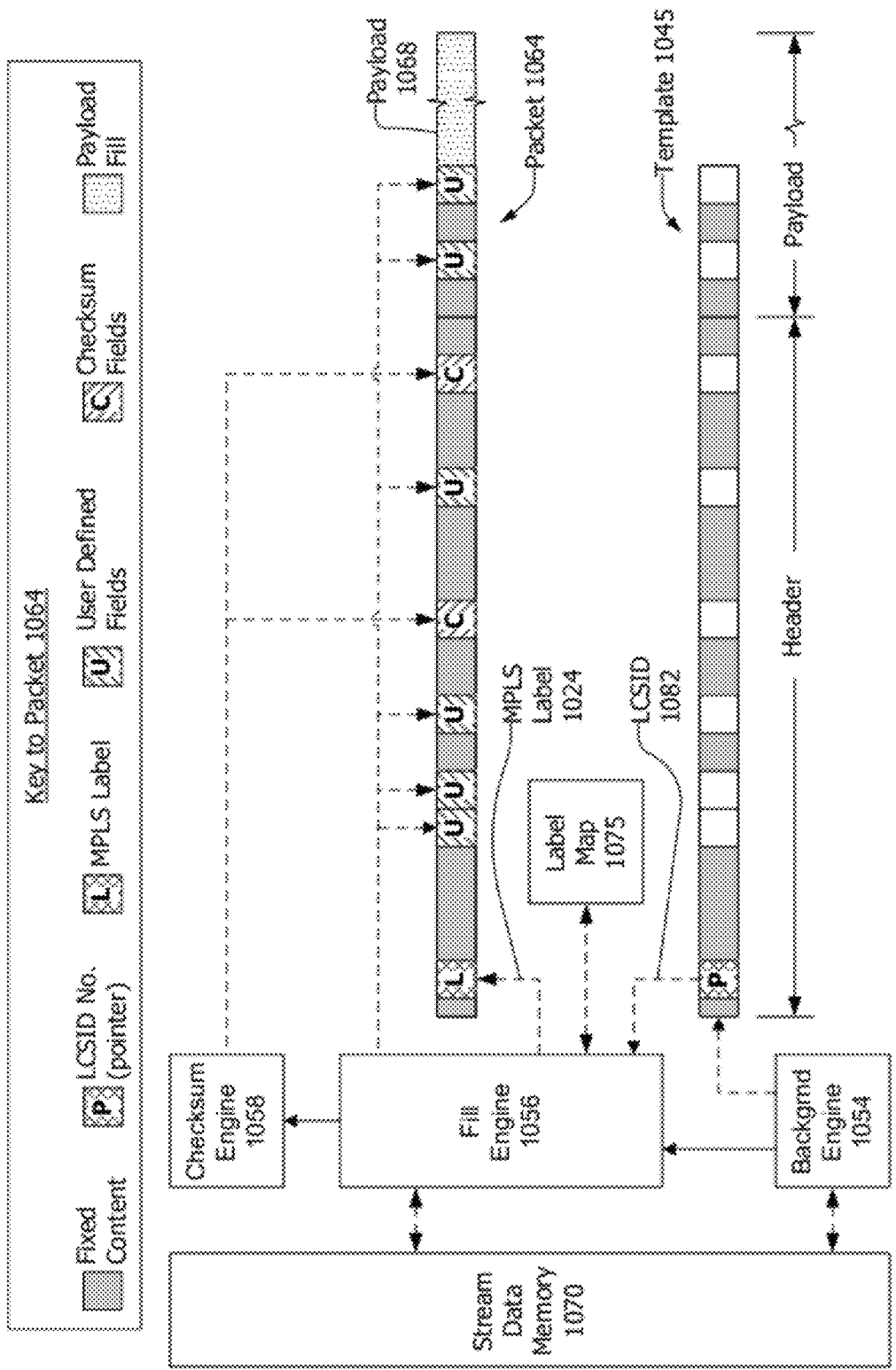
FIG. 10 is a schematic representation of a traffic generator generating a packet.

Exemplary actions taken by a traffic generator that includes a label map memory to generate a packet 1064 are illustrated schematically in FIG. 10. With the exception of the actions taken to insert an MPLS label 1024 into the packet, the actions are similar to those described in conjunction with FIG. 8. Detailed descriptions of similar actions will not be repeated.

A background engine 1054 may retrieve a template 1045 from a stream data memory 1070. The template may include an LCSID 1082 or other pointer, shown with cross hatching and identified by the letter "P".

A fill engine 1056 may receive the template 1074 from the background engine 1054. The fill engine 1056 may extract the LCSID 1082 from the template 1045. The fill engine 1056 may then use the CSID 1082 to generate an address to read an MPLS label 1024 from a label map 1070. The fill engine 1056 may insert the MPLS label into the packet 1064 in the location, shown with cross hatching and identified by the letter "L", previously occupied by the LCSID.

The fill engine may also populate the payload 1068 and additional user defined fields U as previously described. A checksum engine 1058 may calculate and insert one or more checksums into the packet 1064 and a back end engine (not shown in FIG. 10) may insert a cyclic redundancy check value and/or a time code into the packet 1064 as it being transmitted.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A port unit, comprising:
    a label map memory to hold multiprotocol label switching (MPLS) labels;
    a stream data memory that holds stream forming data defining a plurality of packet streams for transmission over a network under test, the stream forming data for at least one packet stream including one or more pointers to respective locations within the label map memory;

a traffic generator for generating the plurality of packet streams in accordance with the respective stream forming data, the traffic generator configured to
retrieve one or more MPLS labels from the label map memory in accordance with the one or more pointers, and
incorporate the one or more retrieved MPLS labels into the at least one packet stream;
a traffic receiver for receiving packets from the network under test; and
a port processor coupled to the traffic generator and the traffic receiver, the port processor comprising a first memory that stores label tracking data including data to uniquely identify each of a plurality of label conditions sets and data associating each label condition set with one or more respective memory locations within the label map memory,
wherein, when a control packet associating an MPLS label with a specific label condition set is received via the traffic receiver, the port processor performs actions including:
extracting the specific label condition set and the associated MPLS label from the received control packet;
retrieving, from the stored label tracking data, addresses for one or more label map memory locations associated with the specific label condition set; and
storing the MPLS label in label map memory locations defined by the one or more retrieved addresses.

2. The port unit of claim 1, wherein the actions performed further comprise one or more of storing the MPLS label within the first memory and communicating the MPLS label to a test administrator external to the port unit.

3. The port unit of claim 1, wherein each control packet associating an MPLS label with a specific label condition set conforms to a protocol selected from Label Distribution Protocol, Constraint-based Label Distribution Protocol, Border Gateway Protocol, Resource Reservation Protocol, and Resource Reservation Protocol—Traffic Extension.

4. The port unit of claim 3, wherein the actions of extracting, retrieving, and storing the MPLS label comprise executing separate daemons for each protocol used to associate MPLS labels.

5. A method for generating traffic, comprising:
storing, in a stream data memory, stream forming data defining a plurality of packet streams for transmission over a network under test, the stream data memory including one or more pointers to respective memory locations in a label map memory reserved for storing multiprotocol label switching (MPLS) labels;
storing, in a first memory, label tracking data including data uniquely defining a plurality of label conditions sets and data associating each label condition set with one or more respective reserved memory locations within the label map memory;
receiving a control packet associating an MPLS label to a specific label condition set;
extracting the specific label condition set and the associated MPLS label from the received control packet;
retrieving, from the stored label tracking data, addresses for one or more label map memory locations associated with the specific label condition set;
storing the MPLS label in label map memory locations defined by the one or more retrieved addresses; and
generating packet streams in accordance with the stored stream forming data.

6. The method for generating traffic of claim 5, further comprising one or more of storing the MPLS label within the first memory and communicating the MPLS label to a test administrator external to the port unit.

7. The method for generating traffic of claim 5, wherein each control packet associating an MPLS label and a specific label condition set conforms to a protocol selected from Label Distribution Protocol, Constraint-based Label Distribution Protocol, Border Gateway Protocol, Resource Reservation Protocol, and Resource Reservation Protocol—Traffic Extension.

8. The method of testing a network of claim 5, further comprising:
while generating packet streams, receiving a control packet that changes the MPLS label associated with at least one of the label condition sets; and
storing the changed MPLS label without stopping generating packets.

9. The method for generating traffic of claim 7, wherein the actions of extracting, retrieving, and storing the MPLS label comprise executing separate daemons for each protocol used to associate MPLS labels.

10. A method for testing a network under test, comprising:
storing stream forming data defining a plurality of packet streams for transmission over a network under test, the stream forming data for at least one packet stream including one or more locations reserved to receive multiprotocol label switching (MPLS) labels;
storing label tracking data including data uniquely defining each of a plurality of label condition sets and data associating each label condition set with one or more respective reserved locations within the stored stream forming data;
receiving control packets from the network under test, each control packet associating; one or more MPLS labels to respective label condition sets from the plurality of label condition sets;
extracting the specific label condition set and the associated MPLS label from the received control packet;
retrieving, from the stored label tracking data, addresses for one or more label map memory locations associated with the specific label condition set;
storing the MPLS label at one or more reserved locations within the stored stream forming data associated with the respective label condition set in accordance with the stored label tracking data; and
generating the plurality of packet streams in accordance with the stored stream forming data and transmitting the generated packet stream to the network under test.

11. The method of testing a network of claim 10, further comprising:
while generating packet streams, receiving a control packet that changes the MPLS label associated with at least one of the label condition sets; and
storing the changed MPLS label without stopping generating packets.

12. The method for generating traffic of claim 10, wherein each control packet associating an MPLS label and a specific label condition set conforms to a protocol selected from Label Distribution Protocol, Constraint-based Label Distribution Protocol, Border Gateway Protocol, Resource Reservation Protocol, and Resource Reservation Protocol—Traffic Extension.

13. The method for generating traffic of claim 12, wherein the actions of extracting, retrieving, and storing the MPLS label comprise executing separate daemons for each protocol used to associate MPLS labels.

14. A computer readable non-transitory storage medium storing program instructions which, when executed, cause a processor to perform actions comprising:
 storing, in a stream data memory, stream forming data defining a plurality of packet streams for transmission over a network under test, the stream data memory including one or more pointers to respective memory locations in a label map memory reserved for storing multiprotocol label switching (MPLS) labels;
 storing, in a first memory, label tracking data including data uniquely defining a plurality of label conditions sets and data associating each label condition set with one or more respective reserved memory locations within the label map memory;
 receiving a control packet associating an MPLS label to a specific label condition set;
 extracting the specific label condition set and the associated MPLS label from the received control packet;
 retrieving, from the stored label tracking data, addresses for one or more label map memory locations associated with the specific label condition set;
 storing the MPLS label in label map memory locations defined by the one or more retrieved addresses; and
 generating packet streams in accordance with the stored stream forming data.

15. The computer readable non-transitory storage medium of claim 14, wherein each control packet associating a MPLS label to a specific label condition set conforms to a protocol selected from Label Distribution Protocol, Constraint-based Label Distribution Protocol, Border Gateway Protocol, Resource Reservation Protocol, and Resource Reservation Protocol—Traffic Extension.

16. The computer readable non-transitory storage medium of claim 15, the actions of extracting, retrieving, and storing the MPLS label comprise executing separate daemons for each protocol used to associate MPLS labels.

17. The computer readable non-transitory storage medium of claim 15, the actions of extracting, retrieving, and storing the MPLS label comprise executing separate daemons for each protocol used to associate MPLS labels.

18. A port unit, comprising:
 a stream data memory that holds stream forming data defining a plurality of packet streams for transmission over a network under test, the stream forming data for at least one packet stream including one or more locations reserved to receive Multi-Protocol Label Switching (MPLS) labels;
 a traffic generator for generating the plurality of packet streams in accordance with the respective stream forming data;
 a traffic receiver for receiving packets from the network under test; and
 a port processor coupled to the traffic generator and the traffic receiver, the port processor comprising a first memory that stores label tracking data including data uniquely defining each of a plurality of label condition sets and data associating each label condition set with one or more respective reserved memory locations within the stream data memory,
 wherein, when a control packet associating an MPLS label with a specific label condition set is received via the traffic receiver, the port processor performs actions including:
  extracting the specific label condition set and the associated MPLS label from the received control packet;
  retrieving, from the stored label tracking data, addresses for one or more reserved stream data memory locations associated with the specific label condition set; and
  storing the MPLS label in the reserved stream data memory locations defined by the one or more retrieved addresses.

19. The port unit of claim 18, wherein the actions performed further comprise one or more of storing the MPLS label within the first memory and communicating the MPLS label to a test administrator external to the port unit.

20. The port unit of claim 18, wherein each control packet associating an MPLS label with a specific label condition set conforms to a protocol selected from Label Distribution Protocol, Constraint-based Label Distribution Protocol, Border Gateway Protocol, Resource Reservation Protocol, and Resource Reservation Protocol—Traffic Extension.

21. The port unit of claim 20, wherein the actions of extracting, retrieving, and storing the MPLS label comprise executing separate daemons for each protocol used to associate MPLS labels.

22. A computer readable non-transitory storage medium storing program instructions which, when executed, cause a processor to perform actions comprising:
 storing stream forming data defining a plurality of packet streams for transmission over a network under test, the stream forming data for at least one packet stream including one or more locations reserved to receive multiprotocol label switching (MPLS) labels;
 storing label tracking data including data uniquely defining each of a plurality of label condition sets and data associating each label condition set with one or more respective reserved locations within the stored stream forming data;
 receiving control packets from the network under test, each control packet associating; one or more MPLS labels to respective label condition sets from the plurality of label condition sets;
 extracting the specific label condition set and the associated MPLS label from the received control packet;
 retrieving, from the stored label tracking data, addresses for one or more label map memory locations associated with the specific label condition set;
 storing the MPLS label at one or more reserved locations within the stored stream forming data associated with the respective label condition set in accordance with the stored label tracking data; and
 generating the plurality of packet streams in accordance with the stored stream forming data and transmitting the generated packet stream to the network under test.

23. The computer readable non-transitory storage medium of claim 22, wherein each control packet associating a MPLS label to a specific label condition set conforms to a protocol selected from Label Distribution Protocol, Constraint-based Label Distribution Protocol, Border Gateway Protocol, Resource Reservation Protocol, and Resource Reservation Protocol—Traffic Extension.

* * * * *